(12) United States Patent
Deme et al.

(10) Patent No.: US 7,737,639 B2
(45) Date of Patent: Jun. 15, 2010

(54) FLUORESCENT LAMPS HAVING DESIRABLE MERCURY CONSUMPTION AND LUMEN RUN-UP TIMES

(75) Inventors: Istvan Deme, Budapest (HU); Laszlo Balazs, Godollo (HU); Katalin Toth, Pomaz (HU); Jon B. Jansma, Pepper Pike, OH (US)

(73) Assignee: General Electric Company, Schenectady, NY (US)

( * ) Notice: Subject to any disclaimer, the term of this patent is extended or adjusted under 35 U.S.C. 154(b) by 148 days.

(21) Appl. No.: 12/047,678

(22) Filed: Mar. 13, 2008

(65) Prior Publication Data

US 2009/0230837 A1 Sep. 17, 2009

(51) Int. Cl.
H01J 17/16 (2006.01)
(52) U.S. Cl. ...................................................... 313/635
(58) Field of Classification Search ......... 313/491–494, 313/634–639
See application file for complete search history.

(56) References Cited

U.S. PATENT DOCUMENTS

| | | | |
|---|---|---|---|
| 4,544,997 A | 10/1985 | Seuter et al. | |
| 4,666,871 A | 5/1987 | Spierings et al. | |
| 5,552,665 A | 9/1996 | Trushell | |
| 5,602,444 A | 2/1997 | Jansma | |
| 5,925,582 A | 7/1999 | Filmer et al. | |
| 6,359,385 B1 | 3/2002 | Denissen et al. | |
| 6,498,432 B1 | 12/2002 | Vossen et al. | |
| 6,531,814 B1 | 3/2003 | Jansma | |
| 6,555,963 B1 | 4/2003 | Snijkers-Hendrickx et al. | |
| 6,583,551 B2 | 6/2003 | Snijkers-Hendrickx et al. | |
| 6,646,365 B1 | 11/2003 | Denissen et al. | |

(Continued)

FOREIGN PATENT DOCUMENTS

EP 1 126 005 A2 8/2001

(Continued)

OTHER PUBLICATIONS

European Patent Office, "International Search Report" for PCT/US2009/031980, mailed Jul. 2, 2009, 4 pages.
European Patent Office, "Written Opinion of the International Searching Authority" for PCT/US2009/031980, mailed Jul. 2, 2009, 9 pages.

Primary Examiner—Joseph L Williams
Assistant Examiner—Brenitra M Lee
(74) Attorney, Agent, or Firm—Pearne & Gordon LLP

(57) ABSTRACT

A fluorescent lamp includes a light-transmissive glass envelope having an inner surface, means for providing an electric discharge to the interior of the glass envelope, a phosphor layer within the interior of the glass envelope and a discharge-sustaining fill gas and a mercury dose sealed inside the light-transmissive glass envelope. The light-transmissive glass envelope can comprise a light-transmissive mixed alkali glass envelope and the phosphor layer can comprise a phosphor layer of approximately three $mg/cm^2$. A barrier layer of approximately 0.3 $mg/cm^2$ or less of alumina can be applied to the inner surface of the light-transmissive glass envelope. The mercury dose can be present in an amount to provide a saturated mercury vapor pressure within the light-transmissive glass envelope throughout substantially the entire life of the lamp. The lamp can have an end-of-life mercury consumption value of approximately 0.63 mg or less, including 0.44 mg or less, and a warm-up value in the range of approximately 40 to 50 seconds or less, including 30 seconds or less.

14 Claims, 1 Drawing Sheet

U.S. PATENT DOCUMENTS

| | | |
|---|---|---|
| 6,683,406 B2 | 1/2004 | Sigai et al. |
| 6,781,302 B2 | 8/2004 | Sigai et al. |
| 7,239,072 B2 | 7/2007 | Snijkers-Hendrickx et al. |
| 2002/0180339 A1 | 12/2002 | Jansma |
| 2003/0085655 A1 | 5/2003 | Van Der Pol et al. |
| 2003/0189409 A1* | 10/2003 | Scott et al. .................. 313/642 |
| 2005/0218812 A1 | 10/2005 | Van Den Brakel et al. |
| 2006/0103315 A1 | 5/2006 | Vossen et al. |
| 2006/0164015 A1 | 7/2006 | Blasig et al. |
| 2007/0138965 A1 | 6/2007 | Geerdinck et al. |

FOREIGN PATENT DOCUMENTS

| | | |
|---|---|---|
| JP | 2002 075275 A | 3/2002 |
| JP | 2006 086129 A | 3/2006 |
| WO | WO 03/085695 A2 | 10/2003 |
| WO | WO 2005/074005 A2 | 8/2005 |
| WO | WO 2006/046213 A1 | 5/2006 |
| WO | WO 2007/034414 A2 | 3/2007 |
| WO | WO 2007/054875 A1 | 5/2007 |

* cited by examiner

FLUORESCENT LAMPS HAVING DESIRABLE MERCURY CONSUMPTION AND LUMEN RUN-UP TIMES

BACKGROUND OF THE INVENTION

This invention relates generally to fluorescent lamps and more particularly to fluorescent lamps that have desirable properties related to the lamps' consumption of mercury and warm-up, or lumen run-up, times.

Fluorescent lamps have found widespread acceptability in the market place for a number of applications and are available in a variety of shapes and forms. For example, the lamps may be linear, curvilinear, U-bent and compact in shape as will be familiar to those having ordinary skill in the art. Typically, fluorescent lamps include a light-transmissive glass envelope with means such as electrodes, for example, for providing an electric discharge to the interior of the glass envelope. A phosphor layer typically applied to the inner surface of the glass envelope comprises the source of the light that the lamp emits. A rare gas and mercury are sealed within the glass envelope, and the mercury functions to excite the phosphors' electrons resulting in the production of light by the lamp in a manner familiar to those having ordinary skill in the art.

Disposing of fluorescent lamps after they have served their useful lives can be problematic because the mercury in the lamps can present environmental concerns. As a result, for reasons related to the environmentally safe disposal of the lamps, it can be useful to minimize the mercury dosages inserted into the glass envelopes during the manufacture of the lamps. A confounding factor in this regard is that the mercury in the fluorescent lamps can be consumed in one manner or another within the glass envelope during operation of the lamps, such as by being taken up by the components and surfaces within the glass envelope for example. Consequently, it is necessary to add sufficient mercury to the lamps during their manufacture to account for the consumption of the mercury so that an adequate amount of mercury will otherwise be available to support the proper operation of the lamps during their lifetimes. Thus, it would be desirable to have available fluorescent lamps wherein the consumption of mercury is such that the lamps can be dosed with a quantity of mercury that allows for the acceptable performance of the lamps throughout their lives while at the same time alleviates the environmental concerns that the mercury presents when the lamps are disposed.

SUMMARY OF THE INVENTION

According to one aspect, a fluorescent lamp includes a light-transmissive glass envelope having an inner surface and means for providing an electric discharge to the interior of the glass envelope. A phosphor layer is provided within the interior of the glass envelope and a discharge-sustaining fill gas and a mercury dose are sealed within the light-transmissive glass envelope. The mercury dose is present in an amount to provide a saturated mercury vapor pressure within the lamp throughout substantially the entire life of the lamp. The lamp has an end-of-life mercury consumption value of approximately 0.63 mg or less and a warm-up time of approximately 30 seconds or less. In a particular embodiment, the lamp has a mercury consumption value of approximately 0.44 mg or less.

According to another aspect, the lamp can include a barrier layer applied to the inner surface of the light-transmissive glass envelope. The barrier layer can comprise a barrier layer of approximately 0.3 mg/cm$^2$ or less of alumina and can contain approximately 85% alpha alumina and approximately 15% gamma alumina.

According to a further aspect the light-transmissive glass envelope can comprise a light-transmissive mixed alkali glass envelope and the light-transmissive glass envelope of mixed alkali glass can contain three to twelve percent sodium oxide.

According to still another aspect, the phosphor layer can comprise a phosphor layer of approximately three mg/cm$^2$ and the phosphor layer can contain an approximately one percent gamma alumina additive by weight in relation to the weight of the phosphor.

According to still a further aspect a fluorescent lamp includes a light-transmissive glass envelope having an inner surface and means for providing an electric discharge to the interior of the glass envelope. A phosphor layer is provided within the interior of the glass envelope and a discharge-sustaining fill gas and a mercury dose are sealed within the light-transmissive glass envelope. The mercury dose is present in an amount to provide a saturated mercury vapor pressure within the lamp throughout substantially the entire life of the lamp. The lamp has an end-of-life mercury consumption value of approximately 0.63 mg or less and a warm-up time in the range of approximately 40 to 50 seconds or less. In this aspect, the light-transmissive glass envelope can comprise a light-transmissive sodalime glass envelope. Additionally, a barrier layer can be applied to the inner surface of the light-transmissive glass envelope. The barrier layer can comprise approximately 0.1 mg/cm$^2$ of gamma alumina and the phosphor layer can comprise a phosphor layer of approximately three mg/cm$^2$ and can contain approximately one percent gamma alumina additive by weight in relation to the weight of the phosphor.

According to yet another aspect, a fluorescent lamp includes a light-transmissive glass envelope having an inner surface and means for providing an electric discharge to the interior of the glass envelope. A phosphor layer is provided within the interior of the glass envelope and a discharge-sustaining fill gas and a mercury dose are sealed within the light-transmissive glass envelope. The light-transmissive glass envelope can comprise a light-transmissive glass envelope of mixed alkali glass, and the phosphor layer can comprise a phosphor layer of approximately three mg/cm$^2$. In this aspect, a barrier layer can be applied to the inner surface of the light-transmissive glass envelope and the light-transmissive glass envelope of mixed alkali glass can contain three to twelve percent sodium oxide. The phosphor layer can contain a approximately one percent gamma alumina additive by weight in relation to the weight of the phosphor. The barrier layer can comprise a barrier layer of approximately 0.3 mg/cm$^2$ or less of alumina containing approximately 85% alpha alumina and approximately 15% gamma alumina.

DETAILED DESCRIPTION OF EMBODIMENTS OF THE INVENTION

Figure 1:
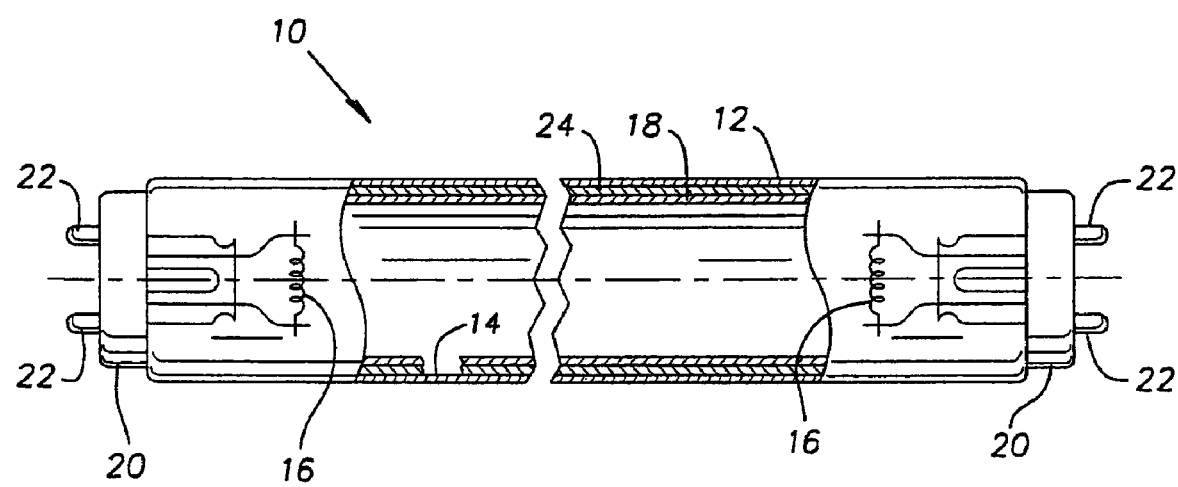
FIG. 1 is a somewhat schematic illustration, partly in cross-section, of a fluorescent lamp according to an embodiment of the invention.

FIG. 1 shows a fluorescent lamp, indicated generally at 10. The lamp includes a light-transmissive glass tube or envelope 12 having an inner surface 14, means 16 for providing an electric discharge to the interior of the glass envelope 12, a phosphor layer 18 within the interior of the glass envelope 12 and a discharge-sustaining fill gas such as argon, neon, krypton, xenon or mixtures thereof, for example, sealed within the light-transmissive glass envelope.

The lamp is hermetically sealed by the bases 20 attached at both ends to the glass envelope 12, and a pair of spaced electrode structures comprises the means 16 for providing an electric discharge to the interior of the glass envelope 12 when an electric current is applied to the electrode structures. As will be familiar to those having ordinary skill in the art, the electric current is delivered to the electrode structures through the pins 22 which are held in lamp sockets or holders not shown that are connected to an electric circuit that includes a source of electric energy.

The embodiment of FIG. 1 also can be provided with a barrier layer as indicated at 24 located between the inner surface 14 of the glass envelope 12 and the phosphor layer 18 within the interior of the glass envelope. As shown in the embodiment of FIG. 1, the barrier layer 24 can be applied as a coating to the inner surface 14 of the glass envelope 12 and the phosphor layer 18 can be applied as a top-coating to the barrier layer 24. As will be understood by those having ordinary skill in the art, the phosphor coating is the source of the light emitted by the lamp 10. The barrier layer is effective to reflect ultraviolet light generated within the glass envelope 12 back to the phosphor layer 18 and enhance the quantity of light generated by the lamp. The provision of such barrier layers can be accomplished, for example, as discussed in U.S. Pat. No. 5,602,444, the content of which is incorporated herein by reference thereto.

The fluorescent lamp shown in FIG. 1 comprises a linear glass envelope of a type that is in routine use for many applications. However, the present invention is not limited to fluorescent lamps comprising linear glass envelopes and the invention can include embodiments where the lamps have different shapes. For example, embodiments of the present invention include lamps that are curvilinear in shape, such as so-called circline and U-bent lamps, as well as compact fluorescent lamps as are familiar to those having ordinary skill in the art. Additionally, the present invention can be used in embodiments where the linear glass envelopes are of various lengths and various diameters. In this connection, the present invention can be used in T8 and T5 lamps for example, having a variety of lengths such as for example two, three, four, six and eight feet.

The operation of fluorescent lamps such as are the subject of the present invention require the presence of mercury which can be inserted within the interior of the glass envelope 12 during the manufacture of the lamp. The mercury dose can be in the form of an amalgam or substantially pure mercury. As will be understood by those having ordinary skill in the art, the mercury atoms, excited by the electrons in the discharge, will emit ultraviolet photons which in turn excite the electrons of the phosphors in the phosphor layer 18 resulting in the production of light that is transmitted through the glass envelope 12 to the surroundings in which the lamp is located.

The amount of mercury inserted into the glass envelope of a fluorescent lamp is a function of a number of variables including, among other considerations, the size of the lamp. With many fluorescent lamps, another consideration is that sufficient mercury be inserted into the glass envelope to insure that a saturated mercury vapor pressure can be sustained within the lamp throughout substantially the entire life of the fluorescent lamp. Operating fluorescent lamps under conditions of a saturated mercury vapor pressure provides certain benefits, as is familiar to those having ordinary skill in the art.

Mercury in fluorescent lamps is consumed during the operation of the lamps. This consumption can occur in various ways such as a result of mercury atoms being captured at the inside surfaces of the glass envelope, including coatings within the glass envelope, and at components such as the electrodes within the glass envelope for example. Consequently, it is necessary when determining the amount of mercury to insert into the glass envelope during the manufacture of the lamp so that a saturated mercury pressure can be sustained throughout substantially the entire life of the fluorescent lamp, to take into account and compensate for the amount of mercury that is expected to be consumed within the glass envelope during the operation of the lamp.

Because mercury can be toxic, various governmental regulations control the manner in which mercury, including mercury that is contained within articles of commerce such as fluorescent lamps, can be disposed. Consequently, it can be advantageous to limit the amount of mercury incorporated into articles that are eventually disposed. And in the case of fluorescent lamps, the amount of mercury incorporated into the lamps can be limited by reducing the amount of mercury consumed within the lamp over the lifetime of the lamp. Stated otherwise, reducing the extent to which the mercury is consumed in the glass envelope of a fluorescent lamp correlatively reduces the amount of mercury that must be inserted into the glass envelope in the first instance during the manufacture of the lamps in order that a saturated mercury pressure can be sustained throughout substantially the entire life of the fluorescent lamp. And reducing the amount of mercury inserted into the glass envelope in the first instance can facilitate disposing of the lamps at the ends of their useful lives under the governmental regulations that control such disposal. At the same time it can be particularly desirable to reduce the amount of mercury while providing a lamp that has a satisfactory warm-up time.

According to one aspect of the present invention, a fluorescent lamp including a light-transmissive glass envelope having an inner surface, means for providing an electric discharge to the interior of the glass envelope, a phosphor layer within the interior of the glass envelope and a discharge-sustaining fill gas and a mercury dose sealed inside the light-transmissive glass envelope is provided wherein the mercury dose is present in an amount to provide a saturated mercury vapor pressure within the lamp throughout substantially the entire life of the lamp and the lamp has an end-of-life mercury consumption value of approximately 0.63 mg or less and a warm-up time in the range of approximately 40 to 50 seconds or less. In another aspect, the lamp can have an end-of-life mercury consumption value of approximately 0.44 mg or less and a warm-up time of 30 seconds or less. The lamp can further include a barrier layer applied to the inner surface of the light-transmissive glass envelope.

The property of the fluorescent lamp that is referred to herein as the "end-of-life mercury consumption value" refers to the amount of mercury inserted into the glass envelope of the lamp during its manufacture that is consumed or taken-up in the glass envelope by one means or another during the operation of the lamp during its entire lifetime which can be 30,000 hours long. Relatedly, the property of the lamp that is referred to herein as the "warm-up time" refers to the period of time that it takes the lamp to reach 80% of its stabilized lumen output after the lamp is turned on. It can be useful in certain circumstances to determine the end-of-life mercury consumption value for a fluorescent lamp without operating the lamp for its entire useful life of 30,000 hours or so. As is familiar to those having ordinary skill in the art, such a determination can be made by operating the lamp for a shorter period of time, determining the amount of mercury consumed in that shorter period of time and applying appropriate statistical methods to determine the amount of mercury that would be consumed over the entire expected lifetime of the lamp such as 30,000 hours. In this connection, an upper prediction limit for the end-of-life mercury consumption value can be determined at a 95% confidence level. And it is intended that all references herein to the end-of-life mercury consumption value comprehend both the actual consumption value realized by operating a lamp for its entire life as well as the consumption value determined by operating the lamp for a shorter period of time and calculating the mercury consumption at an upper prediction limit and a 95% confidence level for the entire life of the lamp.

It has been determined that the composition of the glass envelope, the nature of the barrier layer and the nature of the phosphors of the fluorescent lamps can influence the end-of-life consumption values and the warm-up times of the lamps. In the case of the glass envelope composition, it has been determined that a mixed alkali glass can be advantageously employed as compared to sodalime glass. The term "mixed alkali glass" is intended to refer to a glass that includes more than one alkali metal oxide, such as sodium oxide ($Na_2O$) and potassium oxide ($K_2O$), for example, and where the sodium oxide is present in an amount less than that which is present in sodalime glass. For example, a mixed alkali glass containing approximately three weight percent to 12 weight percent of both $Na_2O$ and $K_2O$ and 67 weight percent to 68 weight percent silicon oxide ($Si_2O$) can be employed. This is to be compared to sodalime glass that typically contains 16 weight percent to 17 weight percent $Na_2O$, 0.3 weight percent to 1.2 weight percent $K_2O$ and 70 weight percent to 73 weight percent $Si_2O$.

With respect to the nature of the barrier layer employed, alumina and, in particular, alumina having a coating weight of approximately 0.3 mg/cm$^2$ and alumina of such a coating weight and containing approximately 85% alpha alumina and approximately 15% gamma alumina can be satisfactorily used. And with respect to the nature of the phosphor layer employed, any of the types of phosphors employed with fluorescent lamps can be employed and, in particular, a phosphor layer of approximately three mg/cm$^2$ and a phosphor layer of approximately three mg/cm$^2$ and containing an approximately one percent gamma alumina additive by weight in relation to the weight of phosphor can be satisfactorily used. An example of a fluorescent lamp incorporating the foregoing characteristics is as follows:

EXAMPLE

A 54W T5 fluorescent lamp was made using a light-transmissive glass envelope produced from a mixed alkali glass containing 7.7 weight percent $Na_2O$, five weight percent $K_2O$ and 67.5 weight percent $Si_2O$, the remainder comprising typical mixed alkali glass constituents. A barrier coating of alumina containing 85% alpha alumina and 15% gamma alumina was applied to the inside surface of the glass envelope so as to have a coating weight of 0.3 mg/cm$^2$, and a phosphor coating containing one percent gamma alumina additive by weight in relation to the weight of phosphor was applied as a top-coating to the barrier coating so as to have a coating weight of three mg/cm$^2$. A discharge sustaining amount of a 9 to 1 mixture of argon gas and krypton gas and a mercury dose were sealed within the glass envelope. The mercury was present in an amount to provide a saturated mercury vapor pressure within the lamp throughout substantially the entire life of the lamp. The lamp when tested had a warm-up time of less than 30 seconds and a projected end-of-life mercury consumption value of 0.44 mg for a projected life of 30,000 hours.

According to another aspect of the invention, fluorescent lamps having good warm-up and end-of-life mercury consumption values can be manufactured from sodalime glass containing 15 mol % to 18 mol % $Na_2O$, for example, rather than from a mixed alkali glass and employing a barrier layer of gamma alumina having a coating weight of approximately 0.1 mg/cm$^2$, for example, and a phosphor layer of any of the rare earth types of phosphors employed with fluorescent lamps as is familiar to those having ordinary skill in the art. And, in particular, a phosphor layer of approximately three mg/cm$^2$ and containing an approximately one percent gamma alumina additive by weight in relation to the weight of phosphor can be satisfactorily used. An example of a fluorescent lamp made according to this aspect of the invention is as follows:

EXAMPLE

A 54W T5 fluorescent lamp was made using a light-transmissive glass envelope produced from a sodalime glass containing 15 weight percent to 18 weight percent $Na_2O$. A barrier coating of gamma alumina was applied to the inside surface of the glass envelope so as to have a coating weight of 0.1 mg/cm$^2$ and a phosphor coating containing 1% gamma alumina by weight in relation to the weight of phosphor was applied as a top-coating to the barrier coating so as to have a coating weight of three mg/cm$^2$. A discharge sustaining amount of a 9 to 1 mixture of argon gas and krypton gas and a mercury dose were sealed within the glass envelope. The mercury was present in an amount to provide a saturated mercury vapor pressure within the lamp throughout substantially the entire life of the lamp. The lamp when tested had a warm-up time in the range of 40 to 50 seconds and a projected end-of-life mercury consumption value of 0.63 mg at a projected life of 30,000 hours.

According to a further aspect, the present invention concerns a fluorescent lamp including a light-transmissive glass envelope having an inner surface, means for providing an electric discharge to the interior of the glass envelope, a phosphor layer within the interior of the glass envelope and a discharge-sustaining fill gas and a mercury dose sealed inside the light-transmissive glass envelope, the light-transmissive glass envelope comprising a light-transmissive glass envelope of mixed alkali glass and the phosphor layer comprising a phosphor layer of approximately three mg/cm$^2$. A barrier layer of approximately 0.3 mg/cm$^2$ or less of alumina also can be provided. This aspect concerns a fluorescent lamp irrespective of the lamp's end-of-life mercury consumption value and warm-up time.

Although the present invention has been described with reference to particular embodiments and aspects, it will be understood by those having ordinary skill in the art that various changes may be made to and equivalents may be substituted for the elements, components and features described without departing from the scope of the invention. Therefore, it is intended that the scope of the invention not be limited to the particular embodiments and aspects described but that the invention include all embodiments and aspects encompassed within the scope of the appended claims

What is claimed is:

1. A fluorescent lamp including a light-transmissive mixed alkali glass envelope having an inner surface, means for providing an electric discharge to the interior of the glass envelope, a phosphor layer within the interior of the glass envelope, a discharge-sustaining fill gas sealed within the light-transmissive glass envelope, and a mercury dose sealed within the light-transmissive glass envelope, the light-transmissive mixed alkali glass envelope comprising approximately 3 to 12 weight percent sodium oxide, the mercury dose being present in an amount to provide a saturated mercury vapor pressure within the light-transmissive glass envelope throughout substantially the entire life of the lamp, the lamp having an end-of-life mercury consumption value of approximately 0.63 mg or less and a warm-up time of approximately 30 seconds or less.

2. The lamp of claim 1 further including a barrier layer applied to the inner surface of the light-transmissive glass envelope.

3. The lamp of claim 2 wherein the barrier layer comprises approximately 0.3 mg/cm$^2$ of alumina.

4. The lamp of claim 3 wherein the barrier layer of alumina contains approximately 85% alpha alumina and approximately 15% gamma alumina.

5. The lamp of claim 3, said phosphor layer having a coating weight of approximately three mg/cm$^2$.

6. The lamp of claim 3 wherein the barrier layer of alumina contains approximately 85% alpha alumina and approximately 15% gamma alumina, and the phosphor layer contains an approximately one percent gamma alumina additive by weight in relation to the weight of phosphor.

7. The lamp of claim 1, said phosphor layer having a coating weight of approximately three mg/cm$^2$.

8. The lamp of claim 7 wherein the phosphor layer contains approximately one percent gamma alumina additive by weight in relation to the weight of phosphor.

9. The lamp of claim 1 wherein the lamp has an end-of-life mercury consumption value of approximately 0.44 mg or less.

10. A fluorescent lamp including a light-transmissive glass envelope of a mixed alkali glass and having an inner surface, means for providing an electric discharge to the interior of the glass envelope, a phosphor layer having a coating weight of approximately three mg/cm$^2$ within the interior of the glass envelope, a discharge-sustaining fill gas sealed within the light-transmissive glass envelope a mercury dose sealed within the light-transmissive glass envelope, and the light-transmissive mixed alkali glass envelope comprising approximately 3 to 12 weight percent sodium oxide.

11. The lamp of claim 10 including a barrier layer applied to the inner surface of the light-transmissive glass envelope.

12. The lamp of claim 11 wherein the barrier layer comprises approximately 0.3 mg/cm$^2$ of alumina.

13. The lamp of claim 11 wherein the barrier layer of alumina contains approximately 85% alpha alumina and approximately 15% gamma alumina.

14. The lamp of claim 10 wherein the phosphor layer contains an approximately one percent gamma alumina additive by weight in relation to the weight of phosphor.

* * * * *